United States Patent
Feldman et al.

[11] Patent Number: 6,129,572
[45] Date of Patent: Oct. 10, 2000

[54] ELECTRICAL CONNECTOR WITH LATCH TO RETAIN IC CARD

[75] Inventors: Steven Feldman, Madison, Ohio; Clyde W. Boling, Austin, Tex.; William D. Risher, Geneva, Ohio; Robert E. Pfleg, Austin, Tex.

[73] Assignee: 3M Innovative Properties Company, Saint Paul, Minn.

[21] Appl. No.: 09/128,529

[22] Filed: Aug. 3, 1998

[51] Int. Cl.[7] ................................................ H01R 13/62
[52] U.S. Cl. .......................................... 439/328; 439/325
[58] Field of Search ................................. 439/328, 136, 439/377, 383, 152, 325–27

[56] References Cited

U.S. PATENT DOCUMENTS

| | | | |
|---|---|---|---|
| 3,993,390 | 11/1976 | Eigenbrode | 439/328 |
| 4,105,275 | 8/1978 | Dixon et al. | 339/91 |
| 4,887,188 | 12/1989 | Yoshida et al. | 361/413 |
| 5,028,767 | 7/1991 | Mizuno | 235/441 |
| 5,033,972 | 7/1991 | Komatsu et al. | 439/153 |
| 5,051,101 | 9/1991 | Komatsu | 439/159 |
| 5,308,251 | 5/1994 | Kaufman et al. | 439/64 |
| 5,327,322 | 7/1994 | Ma | 361/681 |
| 5,331,138 | 7/1994 | Saroya | 235/449 |
| 5,468,156 | 11/1995 | Flinchbaugh et al. | 439/157 |
| 5,526,226 | 6/1996 | Katoh et al. | 361/680 |
| 5,548,484 | 8/1996 | Kantner | 361/737 |
| 5,608,605 | 3/1997 | Siow et al. | 361/684 |
| 5,615,250 | 3/1997 | Kobayashi | 379/61 |
| 5,687,063 | 11/1997 | Chabert | 361/726 |
| 5,688,134 | 11/1997 | Hirata | 439/136 |

FOREIGN PATENT DOCUMENTS

2 241 841  11/1991  United Kingdom ......... H01R 13/633

*Primary Examiner*—Lincoln Donovan
*Assistant Examiner*—Eugene Byrd
*Attorney, Agent, or Firm*—Matthew B. McNutt

[57] ABSTRACT

An electrical connector includes a latch for retaining an IC card. A card adaptor body receives the IC card. The adaptor body has a connector end including a pin header. A pair of opposed card side edge guides extend from the connector end and terminate adjacent an open end of the adaptor body. The IC card is inserted into the adaptor body and has a connector edge engaged with the pin header, a pair of opposed sides engaged with the side edge guides and a rear edge at the open end of the adaptor body. A retainer includes a flexible arm and a hook extending from the connector end into the open end. The hook is automatically engaged with the card rear edge when the card is inserted for retaining the card engaged with the pin header, and is movable out of engagement with the card rear edge to permit the card to be removed from the adaptor body.

42 Claims, 13 Drawing Sheets

ELECTRICAL CONNECTOR WITH LATCH TO RETAIN IC CARD

BACKGROUND

The disclosures herein relate generally to electrical connectors and more particularly to a connector having a resilient latch member for retaining an ancillary electronic module such as an integrated circuit (IC) card in engagement with connector pins.

Circuit cards such as compact flash (CF) cards for example, can easily become separated from host equipment by virtue of their low withdrawal force electrical connectors. While this may be desirable in handheld equipment such as digital cameras and palmtop computers, it can result in unacceptable disconnection in systems which must remain operational under harsh conditions, e.g. telecommunication equipment which uses CF cards and is designed to withstand earthquakes. CF cards can also inadvertently disconnect aboard aircraft, trains, and other ground vehicles when they experience shock and/or vibration, during regular operation or during an impact such as a collision or the like. In fact, in one application, a CF card is used to record collision data. Also, much heavier CF cards are emerging, such as hard drives, where the likelihood of accidental separation from a host is exacerbated by the high mass of the card. In such instances, some form of card retention device is essential. Other needs for card retention are anticipated such as security or theft prevention where an access limited latching or retaining means would discourage unauthorized card insertion or removal.

In U.S. Pat. No. 5,028,767, a sealed holder for an IC card is formed into a card shape and includes an imbedded IC chip such as a semiconductor integrated circuit. A card socket is arranged within a holder housing, and an insertion/ejection port for the IC card is closed by a pivoting door to seal the holder. Linkage and transmission means are operatively associated with the door to facilitate insertion and withdrawal of the IC card.

In U.S. Pat. No. 5,327,322, a built-up pen base computer includes a base, which comprises a flush type LCD mounted on a mother board and an IC card connected to the motherboard at one side, and a case fitted into a rectangular bottom frame on the base and locked by spring-supported keys to carry a set of computer peripheral equipment being respectively and electrically connected to a connector, detachably connected to a connector on the mother board, the rectangular bottom frame having a slot aligned with the disk slot of a floppy disk drive fastened inside the case.

U.S. Pat. No. 5,331,138 discloses a hybrid reader for smart cards and magnetic stripe cards which includes a selective lock mechanism for only smart cards. The mechanism is responsive to the establishment of electrical contacts between the reader and the smart card for activating a latch mechanism. The mechanism is not responsive to the proper seating of a card in the reader or to the presence of only a magnetic stripe card, and requires a greater amount of energy to capture a smart card than is required to release the card.

U.S. Pat. No. 5,526,226 discloses an information processing apparatus which includes a hard disk drive adapted to be accommodated within a main body of the information processing apparatus. The hard disk drive includes a movable member attached thereto. When the movable member slides into a first state, a portion of the movable member protrudes outside the main body of the information processing apparatus. A hinged keyboard is provided for covering the interior of the main body of the information processing apparatus, and when the portion of the movable member protrudes outside the main body, the hinged keyboard is locked in a closed state. Additionally, a latch is provided which may be utilized in conjunction with a card port in order to engage a PCMCIA card and prevent removal thereof. The latch is mounted under the keyboard such that when the keyboard is in a closed state, the PCMCIA card cannot be removed. In this manner, when the keyboard is closed and the movable member slides to the first state, removal of hard disk drive assembly, or other subassemblies within the computer can be efficiently prevented.

U.S. Pat. No. 5,548,484 discloses a card-receiving host having a simple push latch/unlatch mechanism to aid in withdrawing an inserted IC card. The host has dual push latch/unlatch mechanisms which allows the card to be fully inserted and latched when first pushed forward, and, after a second push on the card, unlatches the mechanisms and moves the card rearward by an amount predetermined by the latch implementation to facilitate grasping it to pull it out of the host. In one arrangement the host connector has a male pin assembly that is free to move in and out to accommodate the latch lost motion and to provide the means to transfer the latch spring pressure and motion to the IC card for its rearward travel. The host connector male pins are, in this implementation, terminated to the electronic device frame via a flexible cable. In another system, a pair of actuators are implemented such that the second thrust of the card (to unlatch), will cause the card to be pushed out far enough so that the card contacts are substantially unmated from the host connector contacts.

U.S. Pat. No. 5,608,605 discloses an electronic device having a PC card slot secured by an apparatus inserted into the PC card slot. The apparatus tethers or otherwise secures the electronic device to a display stand. The securing apparatus includes a lock structure and a key structure. The lock structure slides into the PC card slot and locks into place. The lock structure includes a portion shaped to PC card standards, a groove area trailing the PC card shaped portion, and a blocking portion trailing the groove portion. Upon installation, the PC card slot door closes into the groove portion. The lock structure also includes one or more security barriers and an area for receiving a key structure. The key structure defines one or more slots corresponding to the security barriers. The security barriers and key slots mate as the key structure slides into the groove portion. The key's progress into the groove pushes the PC card slot door out of the groove, freeing the lock structure for removal.

In U.S. Pat. No. 5,615,250, a portable telephone set includes a main section, an IC card, and a battery pack, which are removably connected to each other. The battery pack has an L-shaped rib to provide a slot in which the IC card is inserted. When the IC card is inserted in the slot, a side surface of the IC card is brought into contact with a side surface of the battery pack to be held therein in a unified form. In the combined state, a hook section of the battery pack is engaged with an engaging section of the main section. When the battery pack is pushed downward, a depressed portion of the battery pack is engaged with a lock member of the main section so as to fixedly attach the battery pack onto the main section. The IC card is pushed by the battery pack to be brought into contact with a connector of the main section so as to establish a stable connection therebetween.

In U.S. Pat. No. 5,688,134, IC card connector apparatus includes a lock mechanism comprising a box-type casing having a card-receiving opening formed at one end thereof for inserting and ejecting an IC card; an electric connector mounted within the casing opposite the opening for mating with an edge of the IC card; and an eject mechanism including an eject rod disposed on one side of the casing. The connector apparatus further includes a shutter plate slidably mounted at one end of the insertion opening for preventing passage of the IC card therethrough when in a blocking position; and an ON-OFF switch operatively associated with the shutter plate to shut off the electrical connection between the IC card and the connector when the shutter plate is in an open position. One end of the shutter plate engages an end portion of the reject rod as a result of the slide movement of the shutter plate into its blocking position.

In a recent approach, a wire retaining device has been provided for CF cards in applications requiring earthquake resistance. Some limitations of the wire retaining device include the high cost of forming wire to required dimensional tolerances, the wire device causing electrical shorting, and being inadvertently left unlatched which can also cause short circuit damage. The wire device also requires excess space.

Therefore, what is needed is a latch mechanism including a retainer which automatically springs into position to retain a fully seated IC card mated with an electrical connector and which can be flexibly moved to permit release of the IC card from the connector.

SUMMARY

One embodiment, accordingly, provides a latch to retain an IC card mated with an electrical connector. The latch is flexibly pushed aside by the card as the card is inserted into engagement with the connector so that the latch automatically springs back over the rear of the card, retaining the card upon full engagement with the connector. To this end, a connector includes a first end extending in a first direction for connection to a host device. A second end extends in a second direction for connection to an ancillary electronic module. A retainer is flexibly connected to the connector by an arm extending in the second direction for resiliently engaging the ancillary electronic module.

A principal advantage of this embodiment is that the retainer is inexpensive to produce and is formed of non-conductive material which avoids the short circuiting problem associated with the wire retainers. The retainer may be easily coupled with an ejector mechanism if desired and cannot be inadvertently left unlatched. The retainer may be integrally formed with the connector body or may be separately formed and later attached to the connector body.

DETAILED DESCRIPTION OF THE PREFERRED EMBODIMENT

Figure 1:
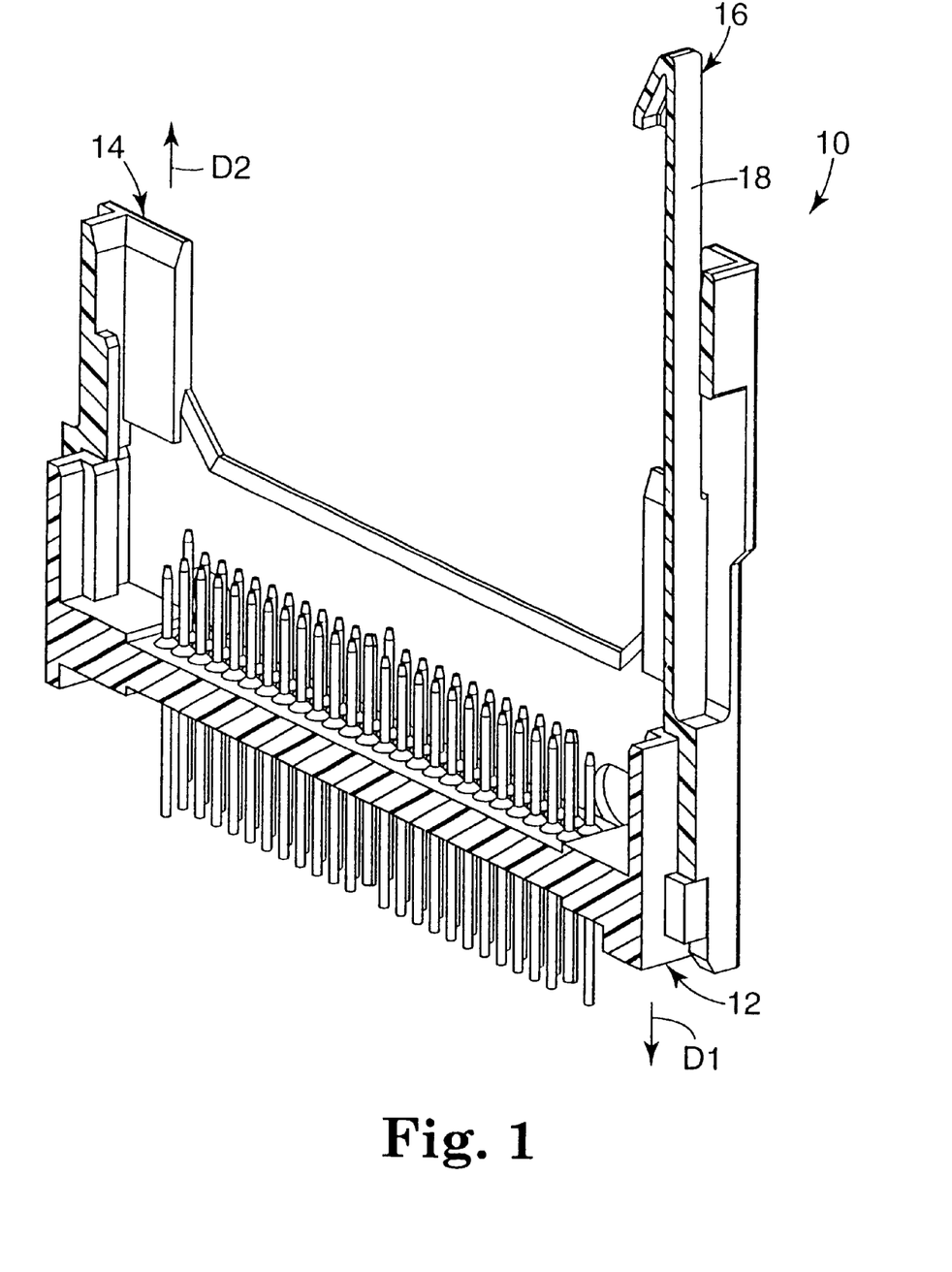
FIG. 1 is an isometric cut-away view illustrating an embodiment of a connector.

In FIG. 1, a connector is generally designated 10 and includes a first end 12 extending in a first direction D1 for connection to a host device (not shown) and a second end 14 extending in a second direction D2 for connection to an ancillary electronic module (not shown). A retainer 16 is flexibly connected to the connector 10 by a flexible arm 18 extending in the second direction D2 for resiliently engaging the ancillary electronic module to be discussed below.

Figure 2:
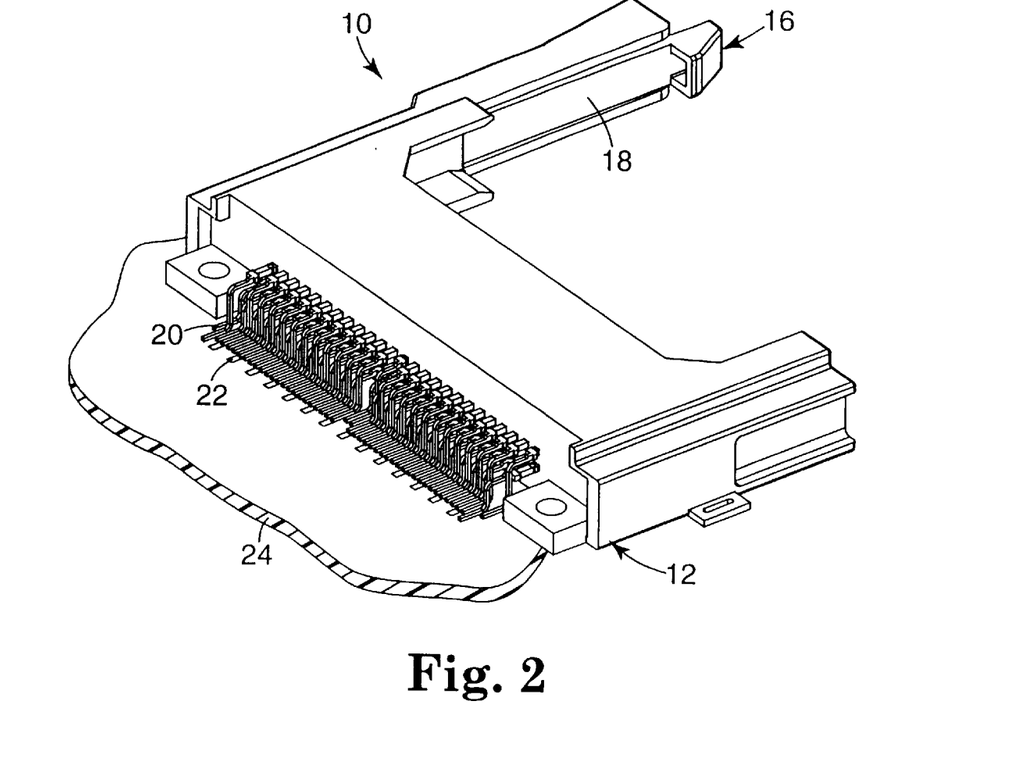
FIG. 2 is an isometric view illustrating an embodiment of a connector attached to a printed circuit board.
Figure 3:
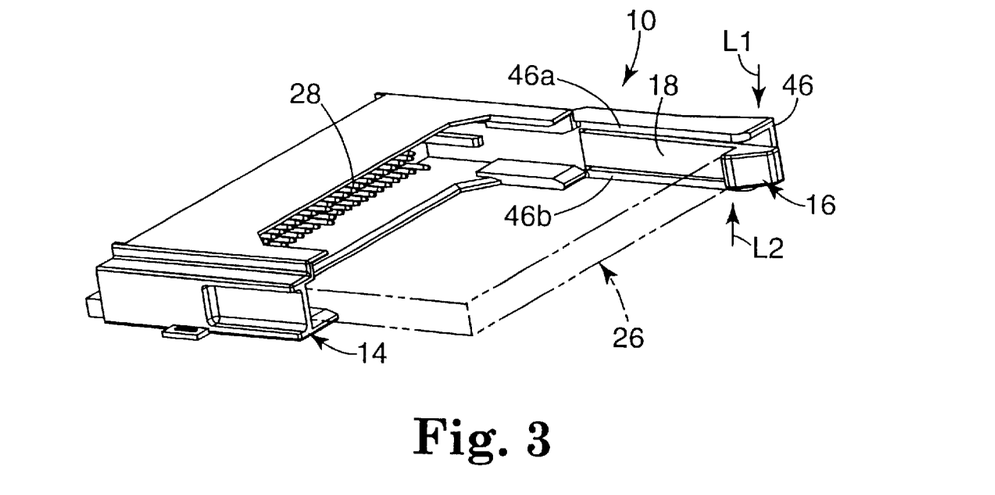
FIG. 3 is an isometric view illustrating an embodiment of a connector including an ancillary electronic module inserted therein.
Figure 4:
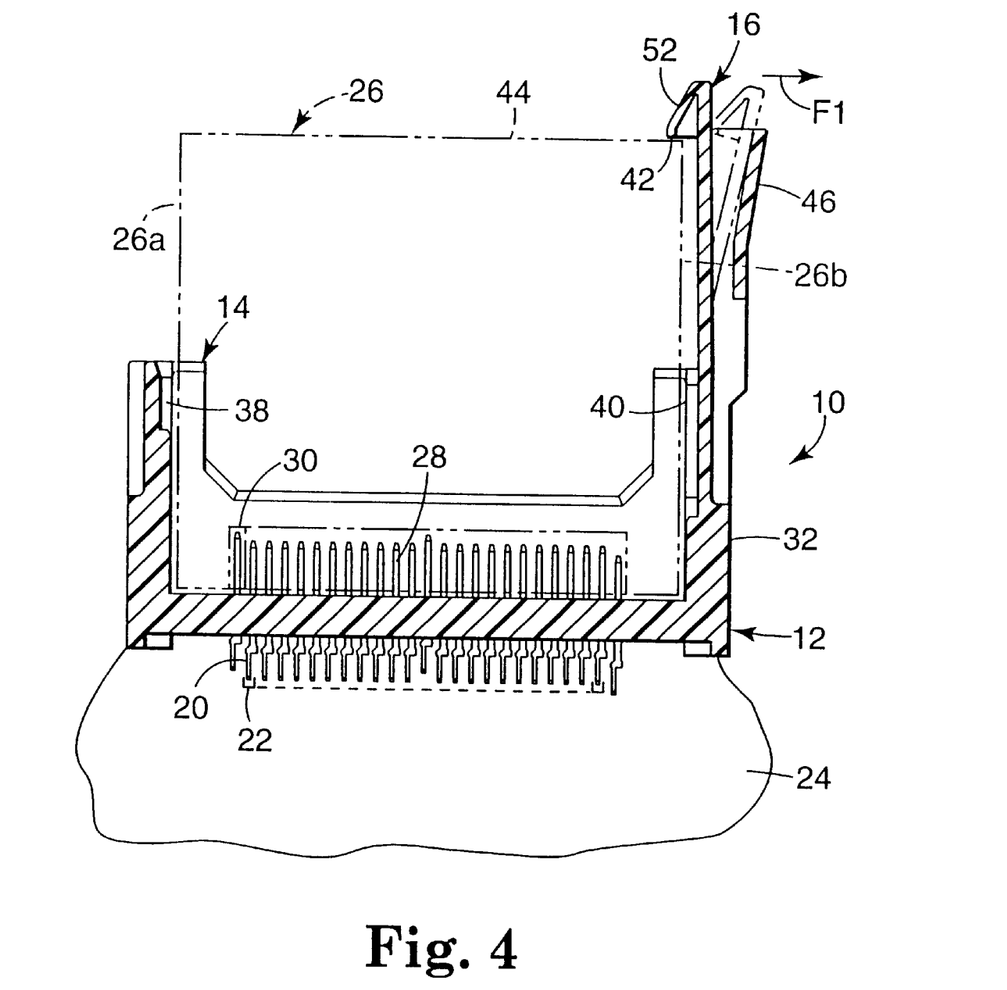
FIG. 4 is a cut-away top view illustrating an embodiment of a connector attached to a printed circuit board.

Connection to a host device at first end 12, FIG. 2, is made by a host connection interface, which may include solder tails 20 for attachment to solder pads 22 on a printed circuit board 24. Connection to an ancillary electronic 26 module at second end 14, FIG. 3, is made by an ancillary module interface, which may include pins 28 for mating connection with sockets 30 provided in the ancillary module 26, FIG. 4. The retainer 16 illustrated in FIG. 4, is integrally formed with the connector 10, and extends from an edge 32 of connector 10. Connector 10 includes first or connector end 12 and second or open end 14. The ancillary electronic module 26 is inserted into open end 14 such that opposed edges 26a and 26b of module 26 engage at least one guide 38, and preferably a second guide 40 which extends from the connector end 12 toward the open end 14. Retainer 16 includes a retainer hook 42 extending adjacent the open end 14 such that hook 42 engages an end wall 44 of module 26 when module 26 is mounted in connector 10 and is engaged with the ancillary module interface pins 28 which mate with sockets 30 of module 26. Such connection may also be made by pins, wires, and fiber optics, each respectively connected to a compatible interface.

Figure 5:
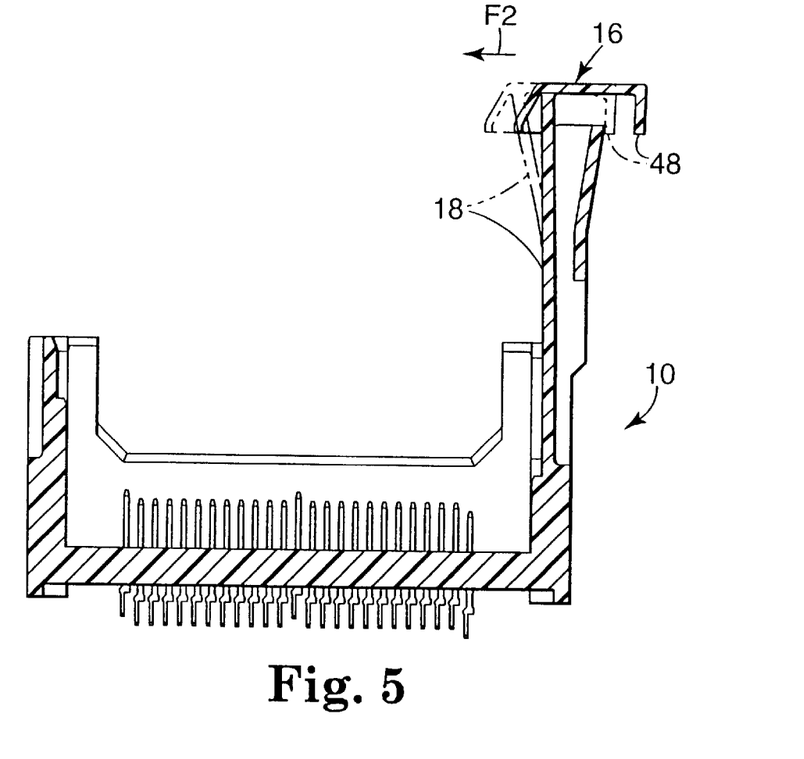
FIG. 5 is a cut-away top view illustrating an embodiment of a connector.

The flexible arm 18 of retainer 16, FIG. 4, is flexible in a first flex direction F1 and is limited in such movement by an overstress stop member 46. A catch member 48 may be added to retainer 16 to similarly limit movement of flexible arm 18 in a second flex direction F2, FIG. 5, which is opposite direction F1 of FIG. 4. In addition, a plurality of sidewalls 46a and 46b, FIG. 3 may be provided to strengthen overstress stop member 46 to isolate flexible arm 18 from possible lateral side loads, designated L1 and L2.

Figure 6:
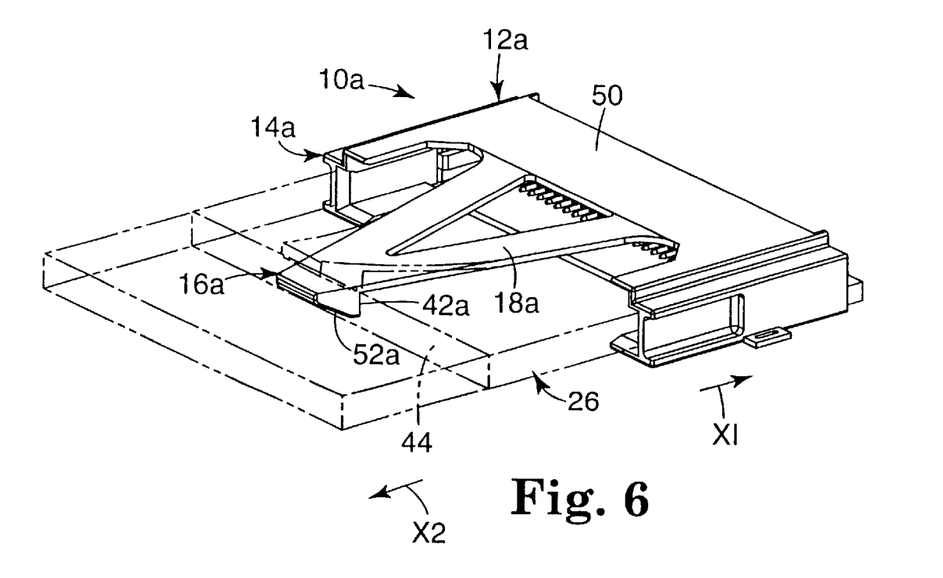
FIG. 6 is an isometric view illustrating an embodiment of a connector including an ancillary electronic module.

Alternatively, retainer 16a may also extend from a side 50 of connector 10a, FIG. 6, as an alternative to extending from the edge 32 as previously discussed and illustrated in FIG. 4. Retainer 16a also includes a flexible arm 18a and a hook member 42a extending adjacent open end 14a such that hook member 42a engages end wall 44 of module 26 when module 26 is mounted in connector 10a. Retainer hooks 16, FIG. 4 and 16a, FIG. 6, are each of a wedge shape respectively including a sloped surface 52, 52a. Thus, sloped surfaces 52 and 52a function similarly, however only surface 52a, FIG. 6, is described for clarifying the following functions. The wedge shape 52a provides a dual function as both a lead-in, without manual assistance, for flexing arm 18a, when module 26 is inserted into connector 10a, in direction X1 and as a grasping surface for manually flexing arm 18a when module 26 is to be removed from connector 10a in direction X2.

Figure 7:
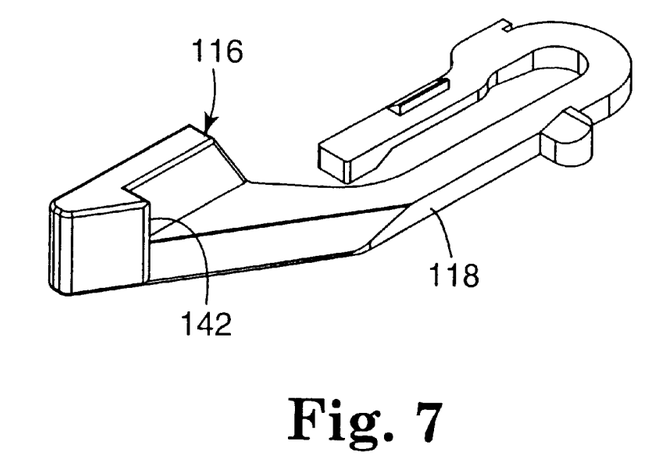
FIG. 7 is an isometric view illustrating an embodiment of a separate retainer arm.
Figure 8:
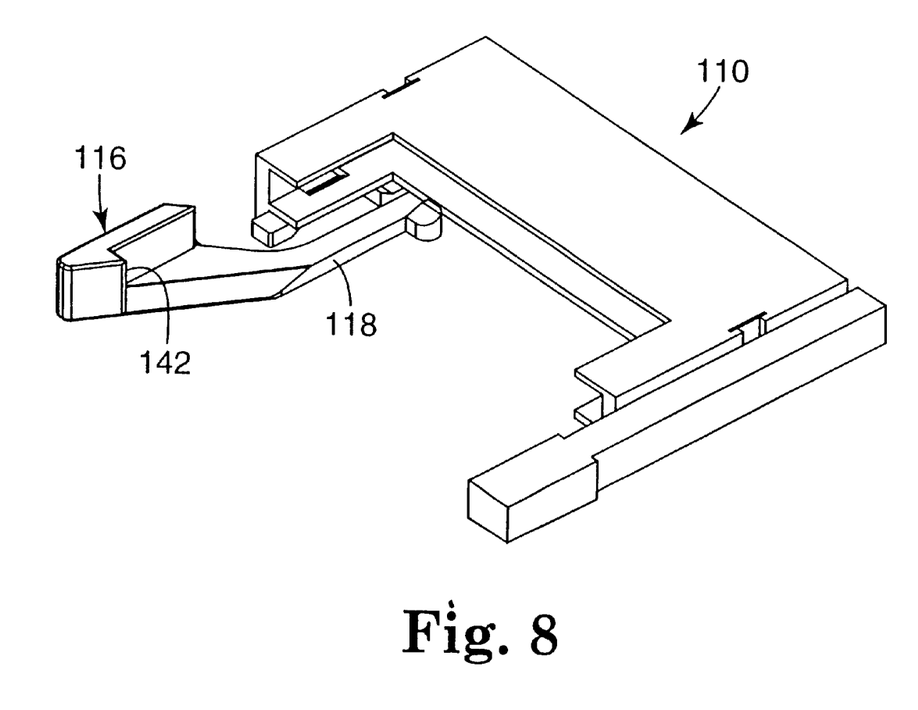
FIG. 8 is an isometric view illustrating an embodiment of the separate retainer arm attached to a connector.
Figure 9:
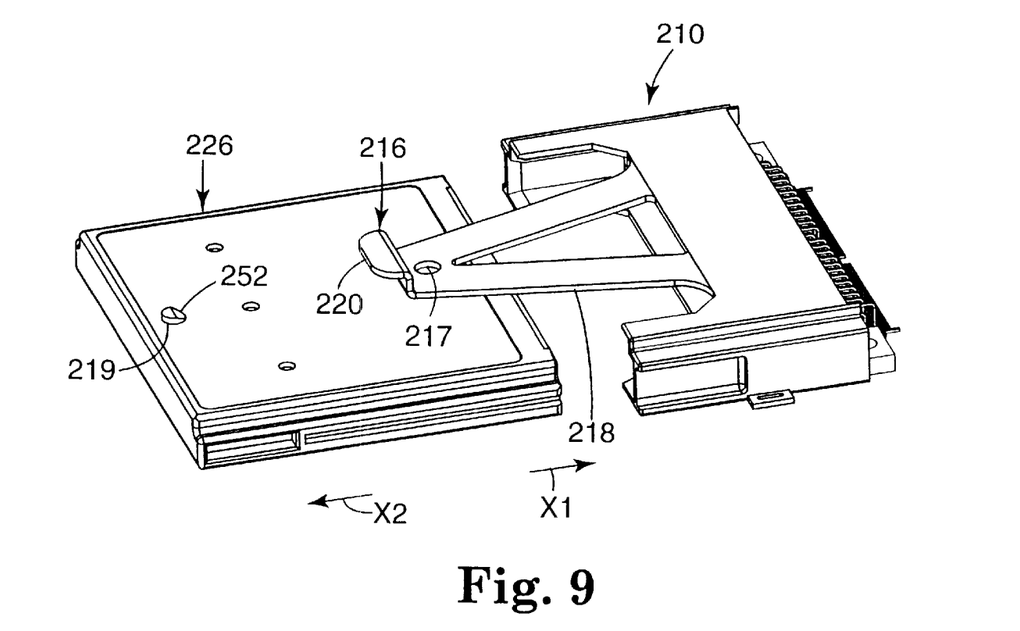
FIG. 9 is an isometric view illustrating an embodiment of an alternate retainer arm.
Figure 10:
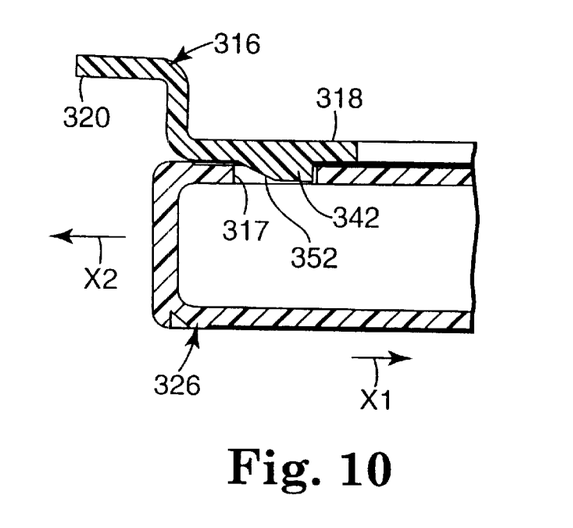
FIG. 10 is a partial cross-sectional view illustrating an embodiment of an alternate retainer arm.

As an alternative to integrally forming retainer 16 with connector 10, it is possible to form a flexible retainer 116, FIG. 7 as a separate part which includes a hook 142 and a flexible arm 118, which can be attached to a connector 110, FIG. 8, or otherwise mounted on connector 110. A further alternative includes a retainer 216, FIG. 9, having a tab receiver 217 formed in a flexible arm 218 extending from a connector 210 for engagement with a tab 219 protruding from an ancillary electronic module 226. Retainer 216 also includes a grasping surface 220 for manually flexing flexible arm 218 out of engagement with tab 219 when module 226 is to be removed from connector 210 in direction X2. A sloped surface 252, formed on tab 219, provides a lead-in, without manual assistance for flexing arm 218 when module 226 is inserted into connector 210 in direction X1. A still further alternative includes a retainer 316, FIG. 10, having a tab 342 formed in a flexible arm 318 out of engagement with tab receiver 317 protruding therefrom for engagement with a tab receiver 317 formed in an ancillary electronic module 326. Retainer 316 includes a grasping surface 320 for manually flexing flexible arm 318 out of engagement with tab receiver 317 when module 326 is to be removed in direction X2. A sloped surface 352, formed on tab 342, provides a lead-in without manual assistance, for flexing arm 318 when module 326 is inserted in direction X1.

Figure 11:
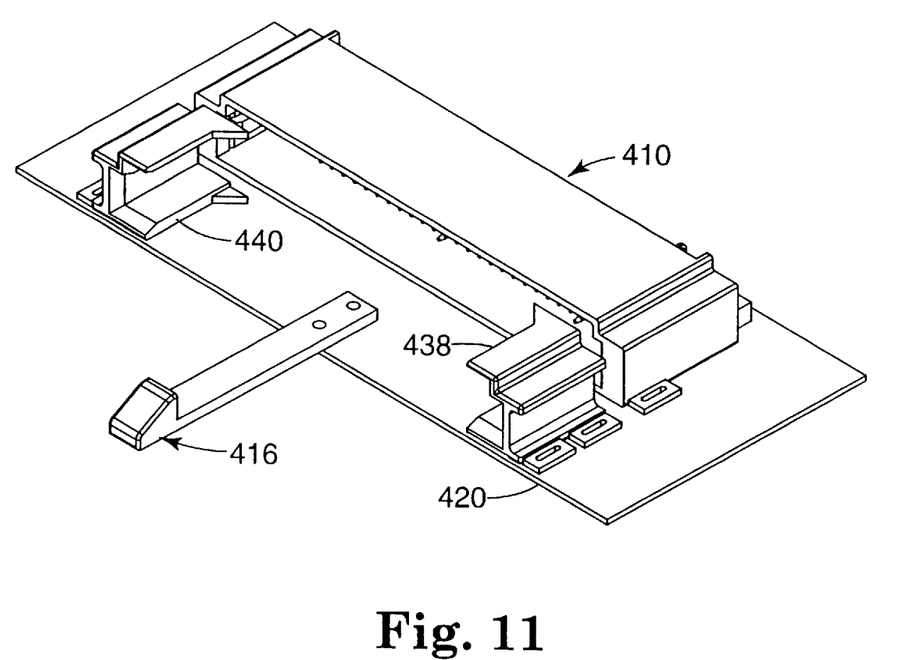
FIG. 11 is an isometric view illustrating an embodiment of a connector formed of separate parts.
Figure 12:
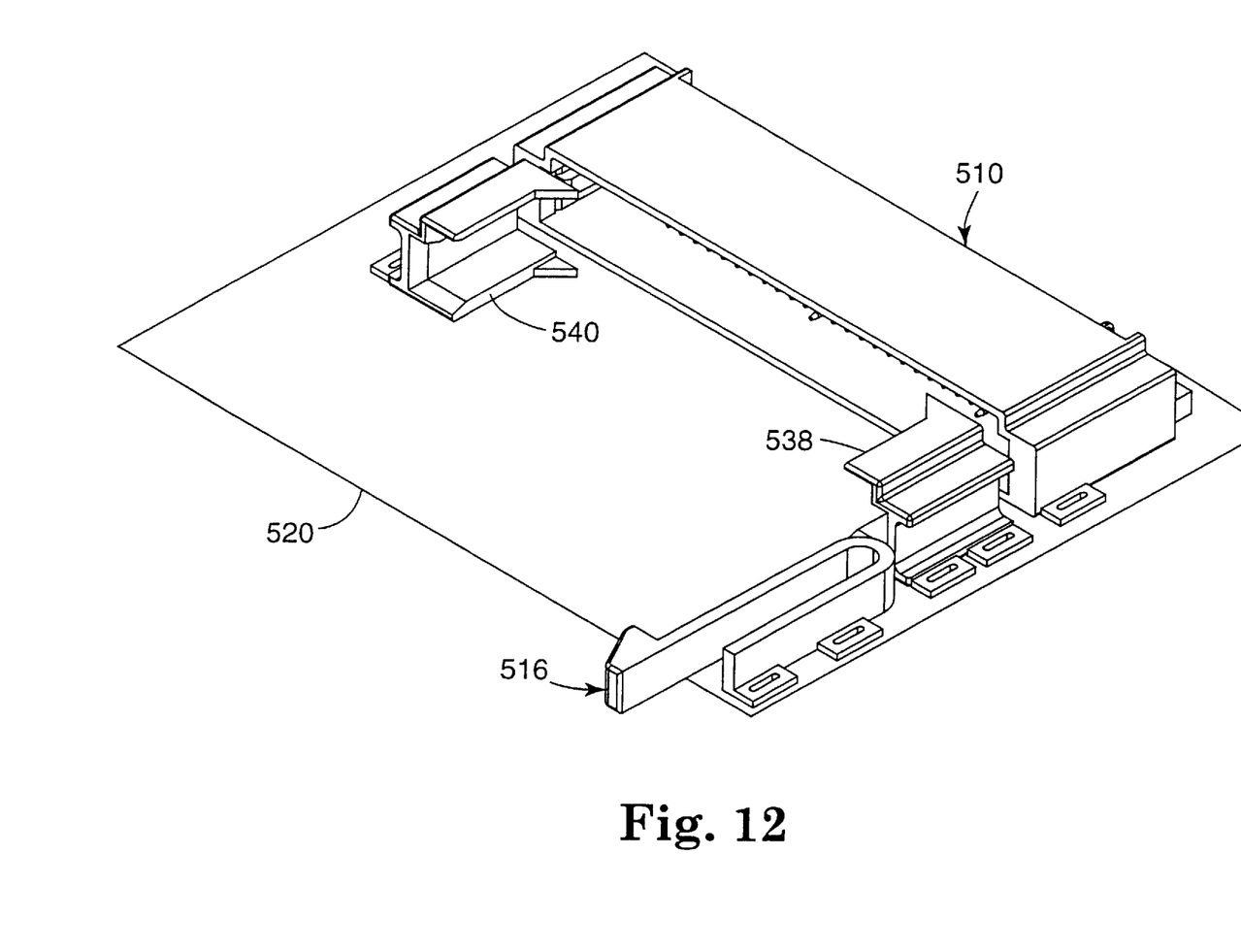
FIG. 12 is an isometric view illustrating an embodiment of another connector formed of separate parts.

It should also be noted that, as illustrated in FIG. 11, a pair of opposed guides 438 and 440, a connector 410, and a side mounted retainer 416, may be provided as separate components mounted on a base 420. Similarly, a pair of opposed guides 538 and 540, FIG. 12, a connector 510, and an edge mounted retainer 516, may also be provided as separate components mounted on a base 520.

Figure 13:
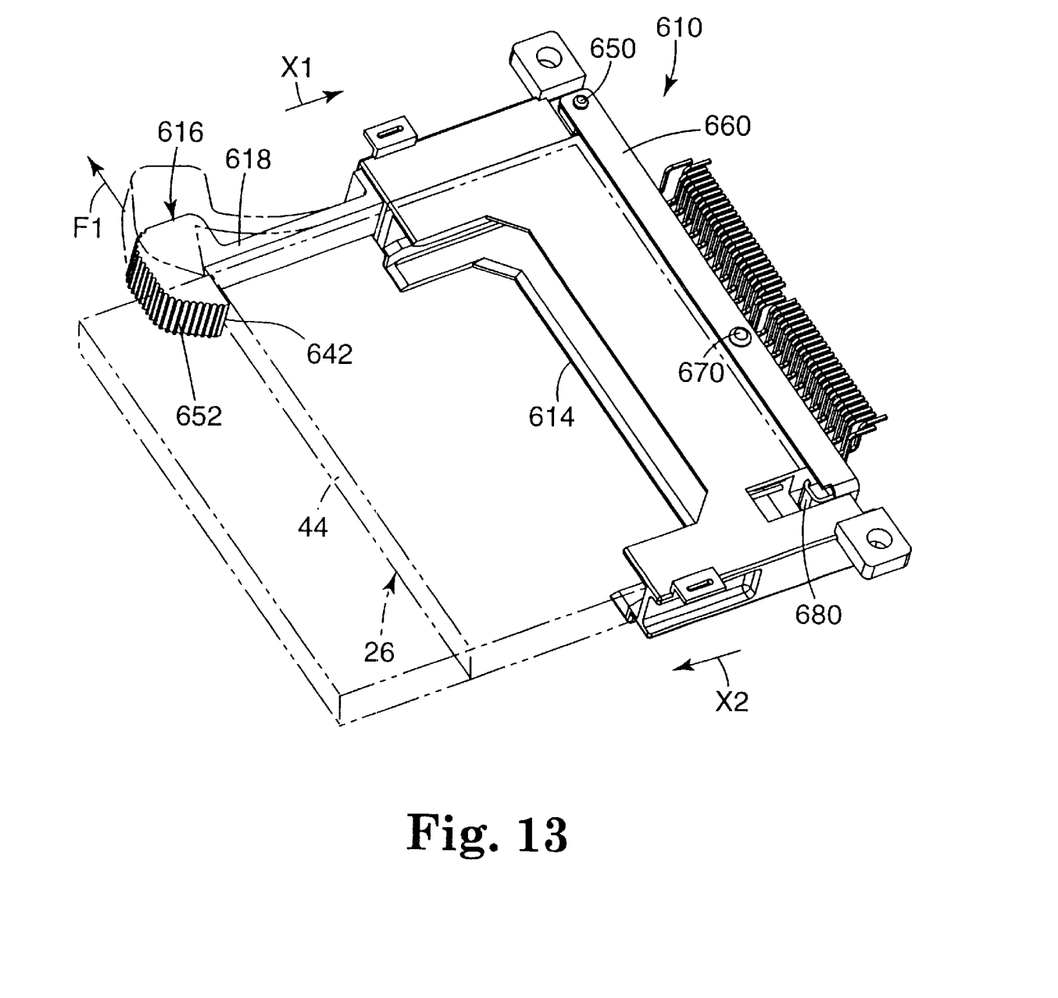
FIG. 13 is an isometric view illustrating an embodiment of a retainer arm combined with an ejector device.

In FIG. 13, a connector 610 includes a retainer 616 connected to a connector 610 by a flexible arm 618. Retainer 616 includes a hook 642 having a sloped surface 652 formed thereon. Movement of ancillary electronic module 26, in direction X1 for engagement with connector 610, engages sloped surface 652 and flexes retainer 616 in direction F1 to permit the module 26 to be inserted in direction X1 into an open end 614 of connector 610 until hook 642 engages end wall 44 of module 26. For removal, retainer 616 is single-handedly manually urged in direction F1 to disengage hook 642 from module 26. Retainer 616 is then, with the same hand, manually urged in direction X1. A connection with retainer 616 at a point 650, pivots an ejector arm 660 about pivot point 670 which urges an ejector tab 680 into engagement with module 26 and moves module 26 in direction X2.

Figure 14:
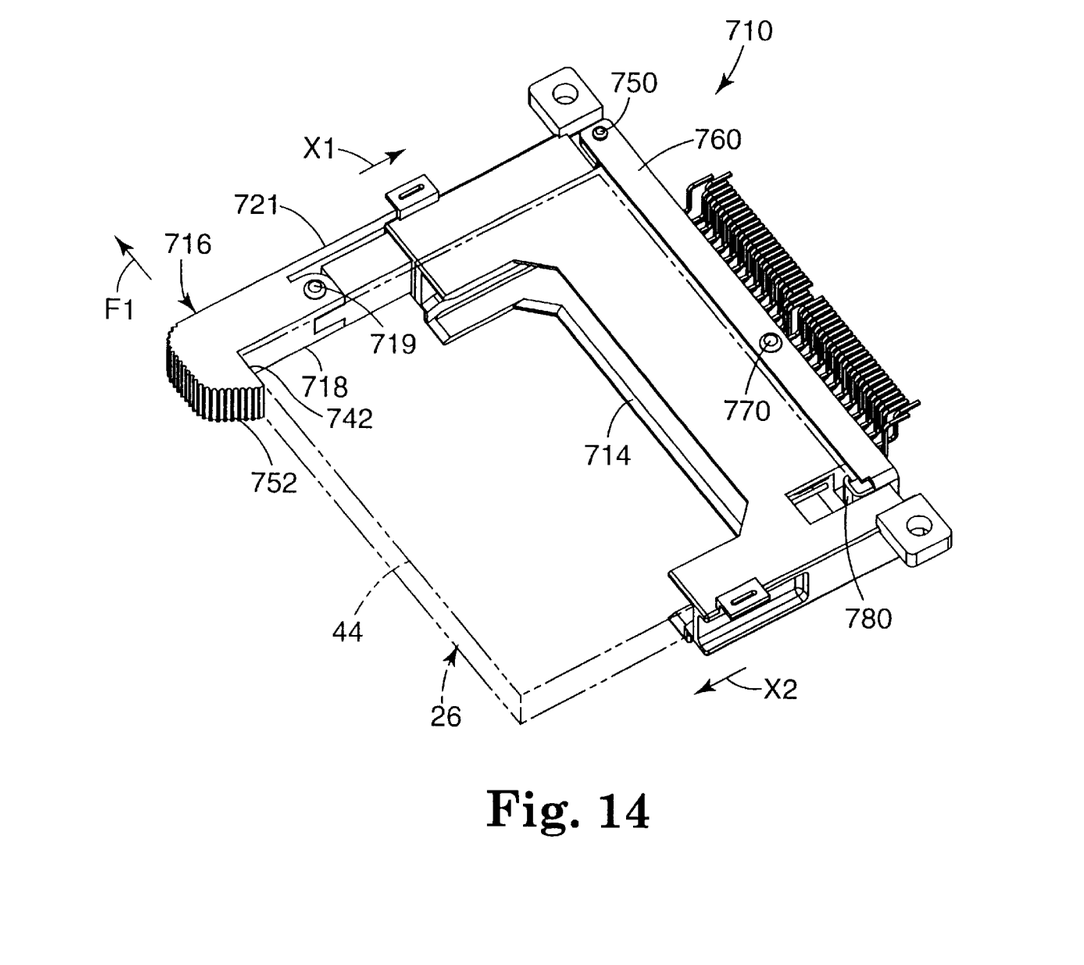
FIG. 14 is an isometric view illustrating an embodiment of another retainer arm combined with an ejector device.

In another embodiment, FIG. 14, a connector 710 includes a retainer 716 connected to connector 710 by an arm 718 pivotable about a pivot point 719. Retainer 716 includes a hook 742 having a sloped surface 752 formed thereon. Movement of ancillary electronic module 26, in direction X1 for engagement with connector 710, engages sloped surface 752 and pivots retainer 716 in direction F1 to permit the module to be inserted in direction X1 into an open end 714 of connector 710 until hook 742 is urged into engagement with end wall 44 of module 26 by a flexible stem 721. For removal, retainer 716 is single-handedly manually urged in direction F1 to disengage hook 742 from module 26. Retainer 716 is then, with the same hand, manually urged in direction X1. A connection with retainer 716 at a point 750, pivots an ejector arm 760 about a pivot point 770 which urges an ejector tab 780 into engagement with module 26 and moves module 26 in direction X2.

Figure 15:
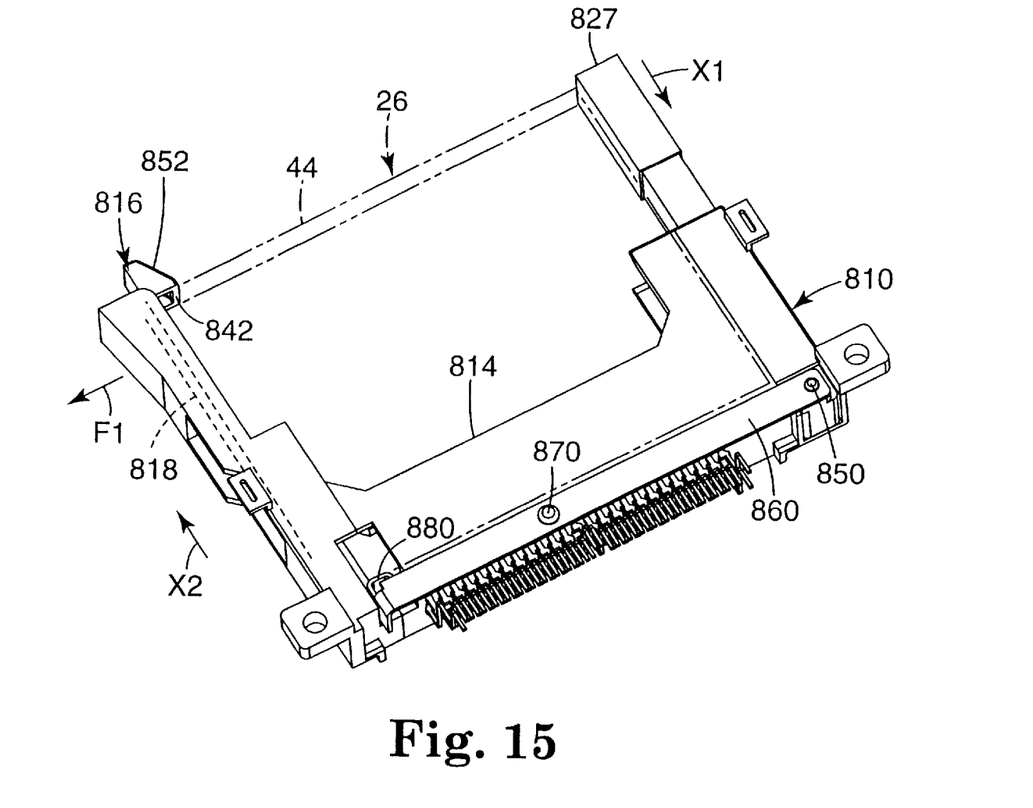
FIG. 15 is an isometric view illustrating an embodiment of a retainer arm and a separate ejector device.

In a further embodiment, FIG. 15, a connection 810 includes a retainer 816 connected to connector 810 by a flexible arm 818. Retainer 816 includes a hook 842 having a sloped surface 852 formed thereon. Movement of ancillary electronic module 26, in direction X1 for engagement with connector 810, engages slopes surface 852 and flexes retainer 816 in direction F1 to permit the module 26 to be inserted in direction X1 into an open end 814 of connector 810 until hook 842 engages end wall 44 of module 26. For removal, retainer 816 is manually urged in direction F1, with one hand, to disengage hook 842 from module 26. A separate ejector plunger 827 is then manually urged in direction X1 with another hand, i.e. a two-handed function. A connection with plunger 827 at a point 850, pivots an ejector arm 860 about a pivot point 870 which urges an ejector tab 880 into engagement with module 26 and moves module 26 in direction X2.

Figure 16:
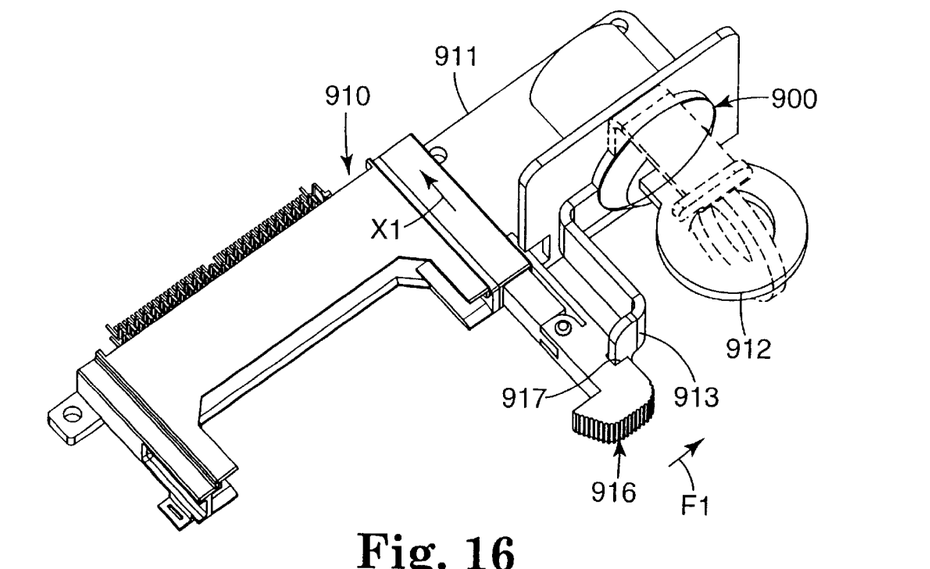
FIG. 16 is an isometric view illustrating an embodiment of a connector having a locking device.

A lock member 900, FIG. 16, is connected to a connector 910 by means of a plate 911 extending from connector 910. Lock member 900 is actuatable by a key 912 to rotate a lock tab 913 into engagement with a retainer arm 916 for limiting pivotal movement of arm 916 for limiting pivotal movement of arm 916 in direction F1. This is accomplished by means of lock tab 913 rotating into engagement with a slot 917 formed in retainer arm 916. In the event that retainer arm 916 also functions as an ejector, as described above, the engagement of tab 913 in slot 917 further limits ejector movement of retainer arm 916 in direction X1. Furthermore, resistance to pivotal movement of arm 916 in direction F1, also limits insertion of an ancillary electronic module, not shown. In another embodiment, FIG. 17, lock member 1000 is connected to a host body or substrate 1011 as is a connector 1010. Lock member 1000 is actuatable by a key 1012 to rotate a lock tab 1013 into engagement with a retainer arm 1016 for limiting pivotal and ejector movement of retainer arm 1016 in directions F1 and X1, respectively, as described above. This is accomplished by lock tab 1013 rotating into engagement with a slot 1017 formed in retainer arm 1016. Other locking devices, such as magnetic locking devices and optical recognition systems, may also be used.

Figure 17:
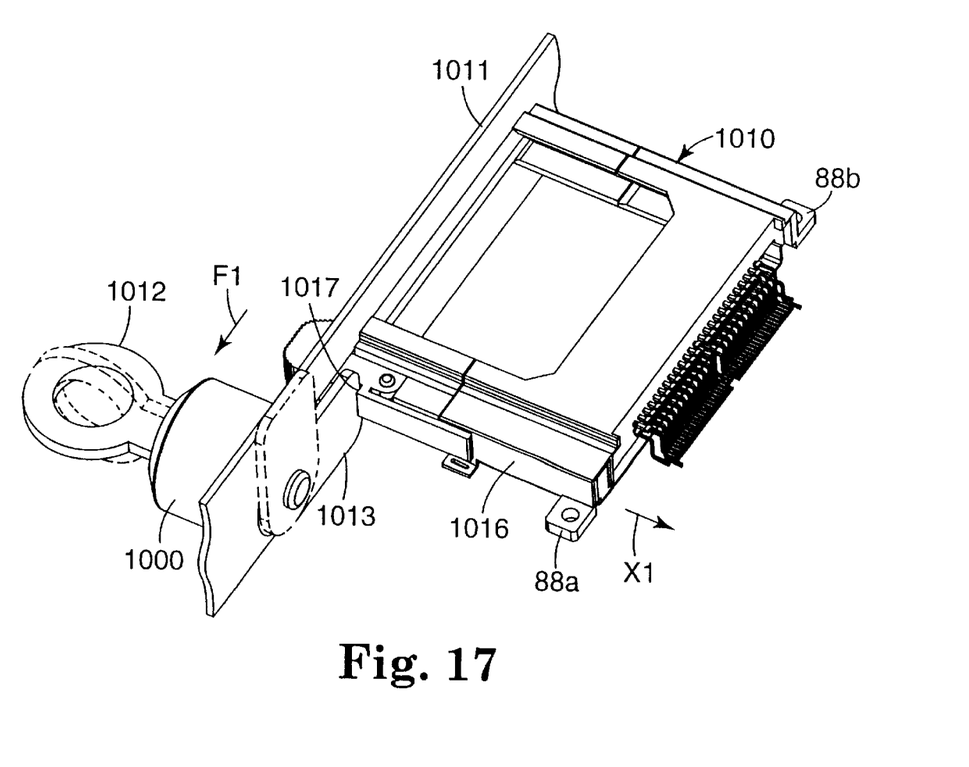
FIG. 17 is an isometric view illustrating an embodiment of a connector having another locking device.
Figure 18:
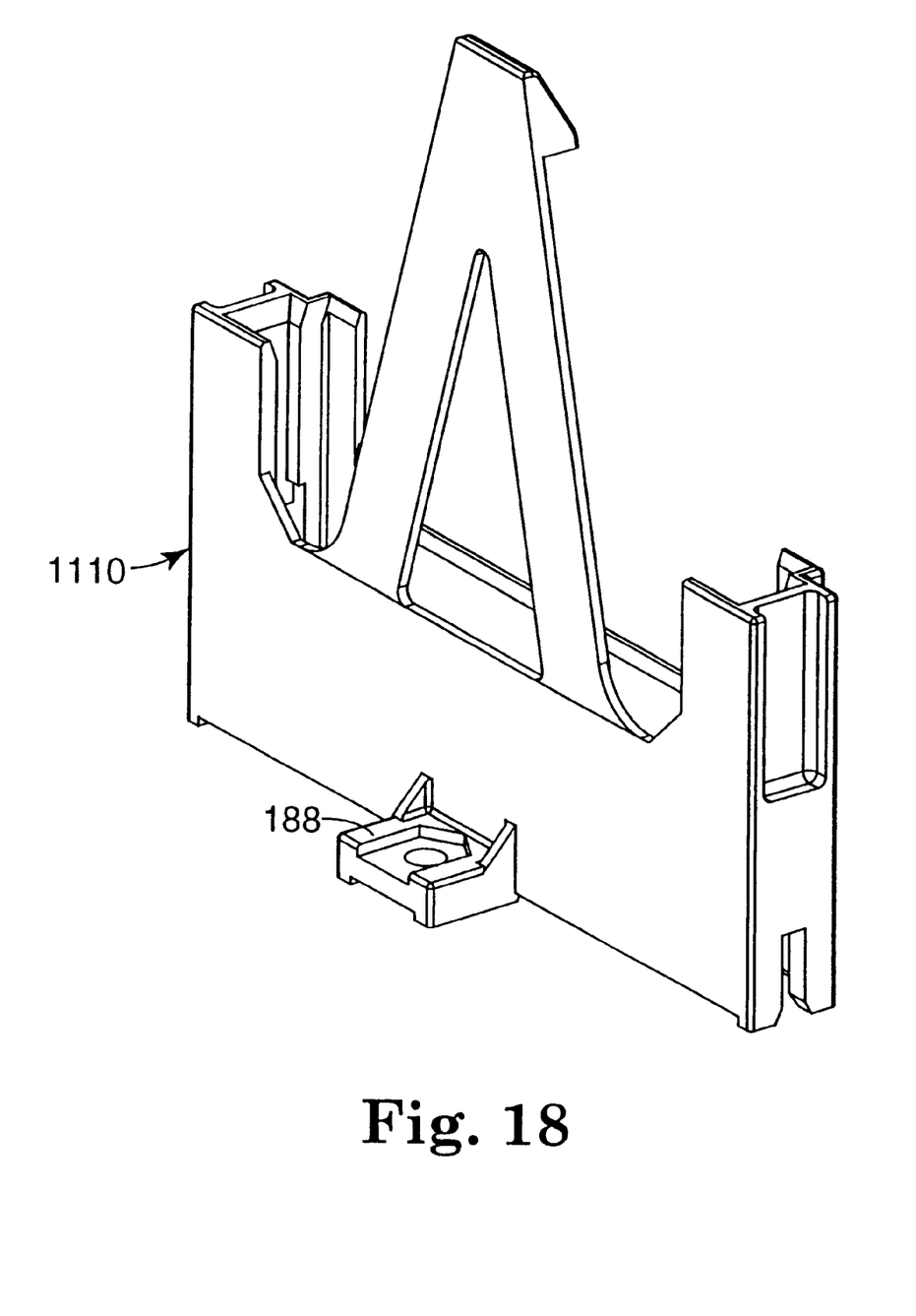
FIG. 18 is an isometric view illustrating another connector.

An additional feature is illustrated in FIG. 17, and includes a pair of stabilizing holddown feet 88a and 88b attached to connector 1010, which can be secured by a fastener, not shown, to an adjacent body, so that a resistance is provided to manual movement of retainer arm 1016. A similar feature is illustrated in FIG. 18, and provides a pair of opposed holddown feet 188, only one of which is visible, attached to a connector 1110 for stabilizing the connector 1110 in a vertical position.

As it can be seen, the principal advantages of these embodiments are that the retainer is inexpensive and is formed of a non-conductive material so as to avoid a short circuiting problem associated with wire retainers. The retainer may be easily coupled with an ejector device and cannot be inadvertently left unlatched. The retainer may be integrally formed with the connector body or may be separately formed as an attachment device.

As a result, one embodiment provides a connector including a first end extending in a first direction for connection to a host device. A second end extends in a second direction for connection to an ancillary electronic module. A retainer is flexibly connected to the connector by an arm which extends in the second direction for resiliently engaging the ancillary electronic module upon insertion in the connector.

Another embodiment provides a connector including a first end for connection to a host device. A second end extends in a second direction and is removably connected to an ancillary electronic module attached to the connector. A retainer is flexibly connected to the connector by an arm extending in the second direction which resiliently engages the ancillary electronic module.

A further embodiment provides a method of retaining an ancillary electronic module in a connector. The module is engaged with, and moves, a latch which extends from a flexible arm extending from the connector. Further movement of the module inserts the module into an open end of the connector. The module slides into the connector and into engagement with an interface mounted in the connector until the latch snaps into engagement with the ancillary electronic module.

Although illustrative embodiments have been shown and described, a wide range of modifications, change and substitution is contemplated in the foregoing disclosure and in some instances, some features of the embodiments may be employed without a corresponding use of other features. Accordingly, it is appropriate that the appended claims be construed broadly and in a manner consistent with the scope or the embodiments disclosed herein.

What is claimed is:

1. A connector comprising:

a first end extending in a first direction for connection to a host device;

a second end extending in a second direction for connection to an ancillary electronic module; and a retainer flexibly connected to the connector by an arm extending in the second direction for resiliently engaging the ancillary electronic module, wherein the retainer is integrally formed with the connector.

2. The connector as defined in claim 1 wherein the first and second ends each include a plurality of conductive elements.

3. The connector as defined in claim 1 wherein the first end includes a host connection interface and the second end includes an ancillary module interface.

4. The connector as defined in claim 1 wherein the retainer is removably engaged with the connector.

5. The connector as defined in claim 1 wherein the first end includes a connector end and the second end includes an open end.

6. A connector comprising:

a first end extending in a first direction for connection to a host device;

a second end extending in a second direction for connection to an ancillary electronic module;

a retainer flexibly connected to the connector by an arm extending in the second direction for resiliently engaging the ancillary electronic module; and at least one guide extending from the connector end toward the open end.

7. A connector comprising:

a first end extending in a first direction for connection to a host device;

a second end extending in a second direction for connection to an ancillary electronic module;

a retainer flexibly connected to the connector by an arm extending in the second direction for resiliently engaging the ancillary electronic module, wherein the arm extends from a side of the connector.

8. The connector as defined in claim 1 wherein the arm extends from an edge of the connector.

9. The connector as defined in claim 5 wherein the retainer includes a retainer hook extending adjacent the open end.

10. The connector as defined in claim 3 further comprising the ancillary electronic module mounted in the connector and engaged with the ancillary module interface.

11. The connector as defined in claim 9 further comprising the ancillary electronic module inserted into the open end, the ancillary module being engaged with the ancillary module interface and being engaged with the retainer hook.

12. The connector as defined in claim 9 wherein the retainer hook is positioned to be engaged with and moved by the ancillary electronic module being inserted into the open end.

13. The connector as defined in claim 8 further comprising an overstress stop member extending adjacent the arm to limit movement of the arm in a first direction.

14. A connector comprising:

a first end extending in a first direction for connection to a host device;

a second end extending in a second direction for connection to an ancillary electronic module;

a retainer flexibly connected to the connector by an arm extending in the second direction from an edge of the connector for resiliently engaging the ancillary electronic module;

an overstress stop member extending adjacent the arm to limit movement of the arm in a first direction; and a catch member extending from the arm to limit movement of the arm in a second direction, opposite the first direction.

15. A connector comprising:

a first end extending in a first direction for connection to a host device;

a second end extending in a second direction for connection to an ancillary electronic module;

a retainer flexibly connected to the connector by an arm extending in the second direction from an edge of the connector for resiliently engaging the ancillary electronic module; and an overstress stop member extending adjacent the arm to limit movement of the arm in a first direction, wherein the overstress stop member includes opposed sidewalls to isolate the arm from lateral side loads.

16. The connector as defined in claim 5 wherein a hold down foot extends from the connector end for resisting an unlatching force imposed on the retainer.

17. The connector as defined in claim 9 wherein the retainer hook is wedge shaped including a sloped lead-in and grasping surface.

18. The connector as defined in claim 3 further comprising a lock member connected to the connector and including a lock tab movable into engagement with the arm for limiting movement of the arm and for blocking insertion of an ancillary electronic module into engagement with the ancillary module interface.

19. A connector comprising:
a first end extending in a first direction for connection to a host device;
a second end extending in a second direction and removably connected to an ancillary electronic module attached to the connector; and
a retainer flexibly connected to the connector by an arm extending in the second direction resiliently engaging the ancillary electronic module, wherein the retainer is integrally formed with the connector.

20. A connector comprising:
a first end extending in a first direction for connection to a host device;
a second end extending in a second direction and removably connected to an ancillary electronic module attached to the connector; and a retainer flexibly connected to the connector by an arm extending in the second direction resiliently engaging the ancillary electronic module, wherein the retainer includes a tab receiver formed in the retainer for engagement with a tab protruding from the ancillary module.

21. The connector as defined in claim 20 wherein the retainer includes a grasping surface adjacent the tab receiver.

22. A connector comprising:
a first end extending in a first direction for connection to a host device;
a second end extending in a second direction and removably connected to an ancillary electronic module attached to the connector; and a retainer flexibly connected to the connector by an arm extending in the second direction resiliently engaging the ancillary electronic module, wherein the retainer includes a tab protruding therefrom for engagement with a tab receiver formed in the ancillary electronic module.

23. The connector as defined in claim 22 wherein the retainer includes a grasping surface adjacent the tab.

24. The connector as defined in claim 19 wherein the first and second ends each include a plurality of conductive elements.

25. The connector as defined in claim 19 wherein the first end includes a host connection interface and the second end includes an interface with the ancillary electronic module.

26. The connector as defined in claim 19 wherein the retainer is snapped into engagement with the connector.

27. The connector as defined in claim 19 wherein the arm extends from an edge of the connector.

28. A connector comprising:
a first end extending in a first direction for connection to a host device;
a second end extending in a second direction and removably connected to an ancillary electronic module attached to the connector; and
a retainer flexibly connected to the connector by an arm extending in the second direction resiliently engaging the ancillary electronic module;
wherein the connector includes a connector end and an open end, the arm extending from a side of the connector and including a retainer hook extending adjacent the open end.

29. The connector as defined in claim 19 wherein the retainer includes a hook positioned to be engaged with and moved by the ancillary electronic module being inserted into an open end of the connector.

30. The connector as defined in claim 19 wherein the arm is flexibly movable to disengage from the ancillary electronic module.

31. A connector comprising:
a first end extending in a first direction for connection to a host device;
a second end extending in a second direction and removably connected to an ancillary electronic module attached to the connector;
a retainer flexibly connected to the connector by an arm extending in the second direction resiliently engaging the ancillary electronic module, wherein the arm is flexibly movable to disengage from the ancillary electronic module; and an ejector member for ejecting the ancillary electronic module from the connector.

32. The connector as defined in claim 31 wherein the ejector member is slidably movable into contact with a pivotal member for ejecting the ancillary electronic module from the connector.

33. The connector as defined in claim 32 wherein the arm is movable in a first direction and the ejector member is movable in a second direction, different from the first direction.

34. The connector as defined in claim 32 wherein the ejector member is movable only after the arm is moved sufficiently to disengage from the ancillary electronic module.

35. The connector as defined in claim 19 wherein the arm is flexibly movable to disengage from the ancillary electronic module, and the arm is slidably movable to eject the ancillary electronic module from the connector.

36. The connector as defined in claim 35 wherein the arm slides into contact with a pivotal member which ejects the ancillary electronic module from the connector.

37. The connector as defined in claim 19 wherein the arm is pivotally movable to disengage from the ancillary electronic module, and the arm is slidably movable to eject the ancillary electronic module from the connector.

38. The connector as defined in claim 37 wherein the arm slides into contact with a pivotal member which ejects the ancillary electronic module from the connector.

39. The connector as defined in claim 19 further comprising a lock member connected to the connector and including a lock tab movable into engagement with the arm for limiting movement of the arm.

40. The connector as defined in claim 35 further comprising a lock member connected to the connector and including a lock tab movable into engagement with the arm for limiting flexible and slidable movement of the arm.

41. The connector as defined in claim 19 further comprising:
a host member;
the connector being attached to the host member; and
a lock member connected to the host member and including a lock tab movable into engagement with the arm for limiting movement of the arm.

42. The connector as defined in claim 29 further comprising a lock member connected to the connector and including a lock tab movable into engagement with the arm for limiting movement of the arm, so that the hook provides an obstruction to inserting the ancillary electronic module into engagement with the connector.

* * * * *